United States Patent
Chatterjee et al.

(10) Patent No.: US 12,411,816 B2
(45) Date of Patent: Sep. 9, 2025

(54) SCHEMA-DRIVEN DISTRIBUTED DATA PROCESSING

(71) Applicant: NETFLIX, INC., Los Gatos, CA (US)

(72) Inventors: Kasturi Chatterjee, Redwood City, CA (US); Justin Cunningham, Orlando, FL (US); Wei Liu, San Jose, CA (US); Prashanth Ramdas, Saratoga, CA (US); Vinod Viswanathan, San Ramon, CA (US); Chunyun Zhao, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 8 days.

(21) Appl. No.: 17/671,046

(22) Filed: Feb. 14, 2022

(65) Prior Publication Data
US 2023/0259498 A1  Aug. 17, 2023

(51) Int. Cl.
*G06F 16/21* (2019.01)
(52) U.S. Cl.
CPC .................... *G06F 16/211* (2019.01)
(58) Field of Classification Search
CPC ...... G06F 16/213; G06F 16/211; G06F 16/21; G06F 16/258; G06F 16/116; G06F 16/214; G06F 16/84; G06F 16/178; G06F 16/27
See application file for complete search history.

(56) References Cited

U.S. PATENT DOCUMENTS

| | | | |
|---|---|---|---|
| 10,678,528 B1* | 6/2020 | Acheson | G06F 9/5077 |
| 10,860,550 B1* | 12/2020 | Chheda | G06F 16/213 |
| 2011/0078113 A1* | 3/2011 | Franz | G06F 16/273 |
| | | | 707/634 |
| 2011/0191292 A1* | 8/2011 | Chen | G06F 16/27 |
| | | | 707/622 |
| 2015/0269198 A1* | 9/2015 | Cornish | G06F 16/211 |
| | | | 707/806 |
| 2016/0026663 A1* | 1/2016 | Krishnamurthy | |
| | | | G06F 16/24568 |
| | | | 709/201 |
| 2016/0132360 A1* | 5/2016 | Raghavan | G06F 9/54 |
| | | | 718/104 |
| 2019/0042290 A1* | 2/2019 | Bailey | G06F 9/5077 |
| 2019/0294978 A1* | 9/2019 | Sachs | G06F 16/2423 |
| 2020/0241942 A1* | 7/2020 | Crouse | G06F 9/544 |
| 2021/0109907 A1* | 4/2021 | Chheda | G06F 16/2379 |

(Continued)

OTHER PUBLICATIONS

Narkhede et al., Kafa the Definitive Guide, https://book.huihoo.com/pdf/confluent-kafka-definitive-guide-complete.pdf, 322 pages.

(Continued)

*Primary Examiner* — William P Bartlett
(74) *Attorney, Agent, or Firm* — Artegis Law Group, LLP

(57) ABSTRACT

One embodiment of the present invention sets forth a technique for performing schema-driven data processing. The technique includes detecting a first change to a first producer schema for a first dataset produced by a first data processor. The technique also includes performing a compatibility check between the first change and a first consumer schema associated with processing of the first dataset by a second data processor, wherein the first consumer schema includes a set of fields required by the second data processor. The technique further includes modifying an operation of the second data processor based on a result of the compatibility check.

20 Claims, 6 Drawing Sheets

(56) References Cited

U.S. PATENT DOCUMENTS

| | | | | |
|---|---|---|---|---|
| 2022/0374296 A1* | 11/2022 | Antinori | ............... | G06F 9/546 |
| 2023/0014239 A1* | 1/2023 | Tekkam | ............... | G06F 16/81 |
| 2023/0095852 A1* | 3/2023 | Paez | ............... | H04L 67/1087 |
| | | | | 717/170 |

OTHER PUBLICATIONS

Tanmay Deshpande, Learning Apache Flink, http://www.k6k4.com/download/resource/src/p06/aatamqymo1548733739106.pdf, 229 pages.

Home Schema Management, "Schema Evolution and Compatibility", https://docs.confluent.io/platform/current/schema-registry/avro.html, 9 pages.

International Search Report for Application No. PCT/US2023/062432 dated May 17, 2023.

Anonymous, "The Wayback Machine—Updating an Existing Pipeline", Retrieved from https://web.archive.org/web/20211209022251/https://cloud.google.com/dataflow/docs/guides/updating-a-pipeline, Dec. 9, 2021, 10 pages.

Anonymous, "The Wayback Machine—Basics of the Beam Model", Retrieved from https://web.archive.org/web/20220120222114/https://beam.apache.org/documentation/basics/, Jan. 20, 2022, 10 pages.

* cited by examiner

| 410 | 412 |
|---|---|
| Processor 3 Consumer Schema<br><br>A: required | Processor 3 Producer Schema V1<br><br>A: required<br>C: optional |

FIG. 4C

| 416 | 418 | 420 |
|---|---|---|
| Processor 4 Consumer Schema<br><br>A: required | Processor 4 Producer Schema V1<br><br>A: required<br>B: optional<br>C: optional | Processor 4 Producer Schema V2<br><br>A: required<br>C: optional<br>D: optional |

FIG. 4D

SCHEMA-DRIVEN DISTRIBUTED DATA PROCESSING

BACKGROUND

Field of the Various Embodiments

Embodiments of the present disclosure relate generally to data processing platforms and, more specifically, to techniques for performing schema-driven distributed data processing.

DESCRIPTION OF THE RELATED ART

Increasing amounts of data are collected, stored, transported, and processed by organizations and other entities. For example, an organization could collect petabytes of data related to millions or billions of users or devices and store the data in tens or hundreds of thousands of datasets across multiple types of data stores. The organization could also query the data from the data stores and/or process the data within multi-stage data pipelines to generate recommendations, alerts, or other types of output or actions based on the data.

However, this increased collection, storage, transport, and processing of data has led to a corresponding increase in resource overhead and complexity in using, tracking, and auditing the data. Continuing with the above example, the organization may fail to track or otherwise manage the datasets and/or data pipelines. As a result, teams within the organization could generate the datasets and develop the data pipelines in isolation. Further, because a given team is unable to easily discover data that is generated or processed by other teams, the same types of data or data pipelines could be duplicated by multiple teams within the organization. This duplication of datasets or data pipelines increases the consumption of computational, storage, and network resources.

As the foregoing illustrates, what is needed in the art are more effective techniques for managing and tracking the generation and processing of data.

SUMMARY

One embodiment of the present invention sets forth a technique for performing schema-driven data processing. The technique includes detecting a first change to a first producer schema for a first dataset produced by a first data processor. The technique also includes performing a compatibility check between the first change and a first consumer schema associated with processing of the first dataset by a second data processor, wherein the first consumer schema includes a set of fields required by the second data processor. The technique further includes modifying an operation of the second data processor based on a result of the compatibility check.

One technical advantage of the disclosed techniques relative to the prior art is that data processors and data schemas are created, tracked, and managed in a centralized manner. Accordingly, the disclosed techniques improve the discoverability and reusability of the data and/or data processors, compared with conventional techniques that lack a centralized mechanism for tracking data sources, data schemas, and/or data pipelines. The improved discovery and reuse of the data and/or data processors additionally reduces resource overhead associated with duplication of data sources and/or data pipelines, in contrast to conventional approaches that involve multiple teams or entities generating data or data processors in isolation. Another technical advantage of the disclosed techniques is that changes to the schema of a first data processor are automatically checked for compatibility with other data processors that depend on the first data processor. Schema changes that are compatible with another data processors can automatically be propagated to the other data processor, while schema changes that are incompatible with another data processor can be used to prevent the other data processor from incorrectly processing data produced by the first data processor. Consequently, the disclosed techniques can be used to efficiently operate and update data pipelines composed of multiple data processors. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4C illustrates an exemplar set of schemas associated with a third data processor that consumes data produced by the first data processor of FIG. 4A, according to various embodiments.

FIG. 4D illustrates an exemplar set of schemas associated with a fourth data processor that consumes data produced by the first data processor of FIG. 4A, according to various embodiments.

DETAILED DESCRIPTION

Figure 1:
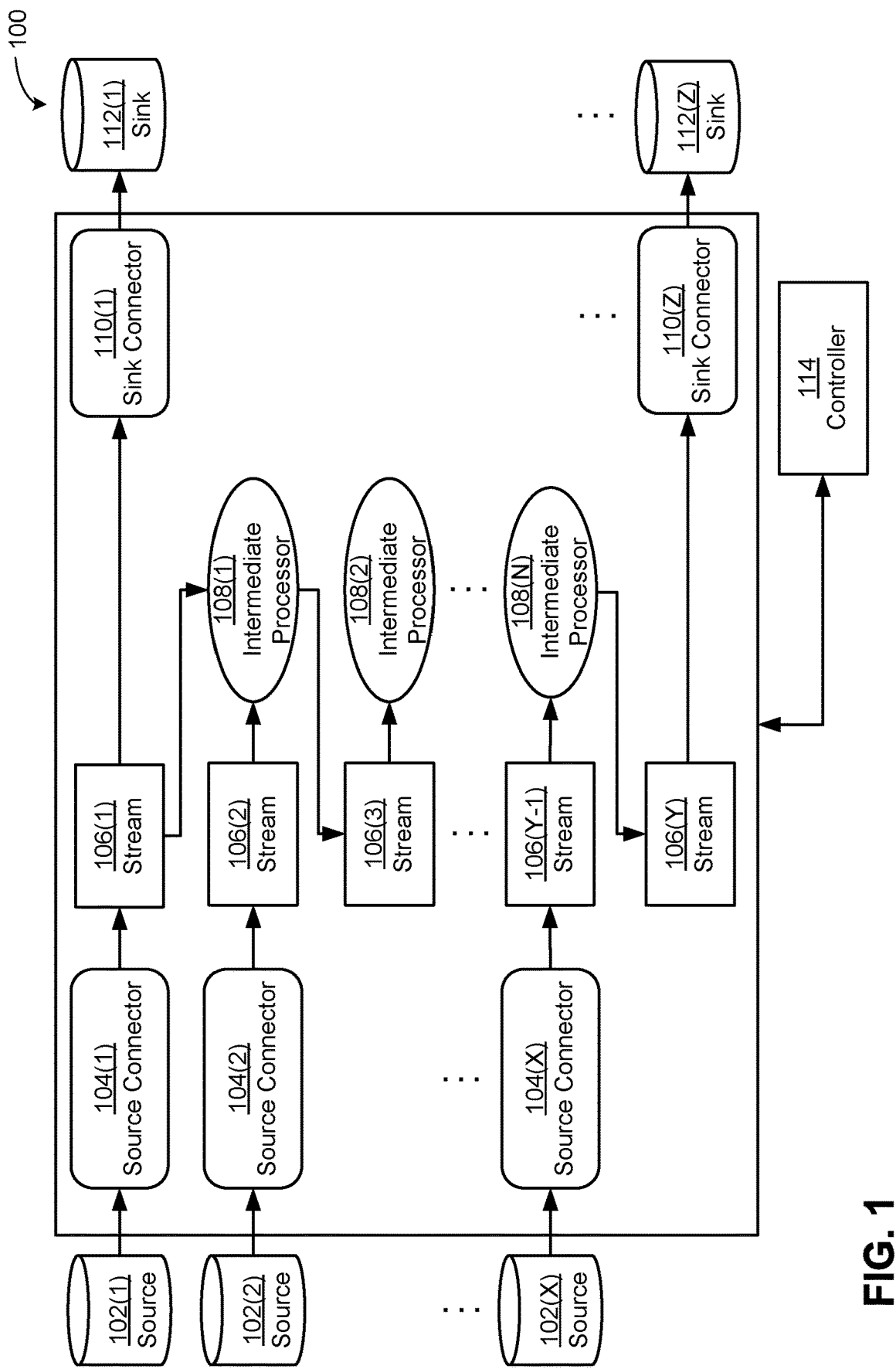
FIG. 1 illustrates a system configured to implement one or more aspects of various embodiments.

In the following description, numerous specific details are set forth to provide a more thorough understanding of the various embodiments. However, it will be apparent to one skilled in the art that the inventive concepts may be practiced without one or more of these specific details.

Data stores such as databases and data warehouses are used to store increasing quantities of data across increasing numbers of datasets. Complex multi-stage data pipelines are also used to transport the data between data stores, convert the data to different formats, generate predictions or recommendations related to the data, and/or perform other types of processing related to the data. For example, an organization could store petabytes of data related to users, devices, events, sensor readings, and/or other entities across tens or hundreds of thousands of datasets. As new data sources (e.g., applications, devices, sensors, repositories, etc.) are added, the organization could create new datasets to store the data. The organization could additionally develop data pipelines to transport, aggregate, analyze, and/or otherwise process the data.

However, this increased collection, storage, transport, and processing of data has lead to a corresponding increase in resource overhead and complexity in using, tracking, and auditing the data. Continuing with the above example, the organization could lack a centralized mechanism for tracking the datasets and/or data pipelines. As a result, teams within the organization could generate the datasets and develop the data pipelines in isolation. Further, because a given team is unable to easily discover data that is generated or processed by other teams, the same types of data or data pipelines could be duplicated by multiple teams within the organization. This duplication of datasets or data pipelines increases the consumption of computational, storage, and network resources and diverts time and attention away from other tasks to be performed by the teams.

To address at least these issues, a distributed data-processing system includes multiple reusable and configurable data processors. Each data processor performs data-processing operations with respect to one or more input datasets to produce one or more output datasets. A series of data processors can also be linked within a data pipeline, so that the output of a given data processor is used as the input into the next data processor.

Each data processor produces or consumes data in accordance with one or more schemas. More specifically, each data processor includes a producer schema that represents the data generated by the data processor and/or a consumer schema that represents the data that is required for consumption by the data processor. When a producer schema for a first data processor changes, a controller in the distributed data-processing system performs compatibility checks between the producer schema and the consumer schemas of any other data processors that consume data generated by the first data processor. During the compatibility checks, the controller determines that the change to the producer schema is incompatible with a consumer schema when the change includes a field that has been removed from the producer schema and the same field is included in the consumer schema. After the controller identifies the change to the producer schema as incompatible with the consumer schema, the controller discontinues execution of the data processor associated with the consumer schema.

On the other hand, the controller determines that the change to the producer schema for the first data processor is compatible with a consumer schema for another data processor if the change to the producer schema does not interfere with consumption of the data generated by the first data processor by the other data processor. For example, the controller could determine that the change to the producer schema is compatible with the consumer schema for the other data processor if the change includes adding a field, renaming a field, and/or removing a field that is not included in the consumer schema. If the change to the producer schema is compatible with the consumer schema, the controller allows the other data processor to continue executing.

When the producer schema for the first data processor is compatible with the consumer schema for another data processor that consumes data generated by the first data processor, the controller selectively propagates some or all changes to the producer schema to the other data processor. If the other data processor is configured to "opt in" to schema propagations from the first data processor, the controller propagates all fields from the producer schema for the first data processor to another producer schema for the other data process. If the other data processor is configured to "opt out" of schema propagations from the first data processor, the controller propagates fields that are found in the consumer schema for the other data processor from the producer schema for the first data processor to the other producer schema for the other data processor.

One technical advantage of the disclosed techniques relative to the prior art is that data processors and data schemas are created, tracked, and managed in a centralized manner. Accordingly, the disclosed techniques improve the discoverability and reusability of the data and/or data processors, compared with conventional techniques that lack a centralized mechanism for tracking data sources, data schemas, and/or data pipelines. The improved discovery and reuse of the data and/or data processors additionally reduces resource overhead associated with duplication of data sources and/or data pipelines, in contrast to conventional approaches that involve multiple teams or entities generating data or data processors in isolation. Another technical advantage of the disclosed techniques is that changes to the schema of a first data processor are automatically checked for compatibility with other data processors that depend on the first data processor. Schema changes that are compatible with another data processors can automatically be propagated to the other data processor, while schema changes that are incompatible with another data processor can be used to prevent the other data processor from incorrectly processing data produced by the first data processor. Consequently, the disclosed techniques can be used to efficiently operate and update data pipelines composed of multiple data processors. These technical advantages provide one or more technological improvements over prior art approaches.

System Overview

FIG. 1 illustrates a system 100 configured to implement one or more aspects of the present disclosure. In some embodiments, system 100 is configured to perform distributed processing of data associated with a number of sources 102(1)-102(X) and a number of sinks 112(1)-112(Z). Each of sources 102(1)-(X) is referred to individually as source 102, and each of sinks 112(1)-112(Z) is referred to individually as sink 112.

In one or more embodiments, each source 102 and each sink 112 corresponds to a different data store. A given source 102 acts as an external source of data that is imported into and processed within system 100. For example, sources 102 could include (but are not limited to) one or more "ground truth" data stores, such as relational databases, non-tabular databases, column stores, key-value stores, and/or other types of data stores that act as primary sources of data. A given sink 112 acts as an external recipient of data that has been processed within system 100. For example, sinks 112 could include one or more of the same data stores as sources 102. Sinks 112 could also, or instead, include other types of data stores, such as (but not limited to) data warehouses, analytics data stores, search engines, and/or other components for storing, retrieving, and/or managing datasets produced by system 100.

In some embodiments, system 100 includes different types of data processors that implement various stages of data processing between sources 102 and sinks 112. Each data processor receives one or more sets of input data and generates one or more sets of output data. As shown in FIG. 1, these data processors include, without limitation, a number of source connectors 104(1)-104(X), a number of sink connectors 110(1)-110(Z), and a number of intermediate processors 108(1)-108(N). Each of source connectors 104(1)-104(X) is referred to individually as source connector 104, each of sink connectors 110(1)-110(Z) is referred to individually as sink connector 110, and each of intermediate processors 108(1)-108(N) is referred to individually as intermediate processor 108.

Each source connector 104 retrieves data from a corresponding source 102 for subsequent processing within system 100. For example, each source connector 104 could detect changes to a corresponding data store by reading from a transaction log for the data store on a continuous or periodic basis. Each source connector 104 could then write the changes as change data capture (CDC) events within system 100.

Intermediate processors 108 perform processing of data from source connectors 104 and/or other intermediate processors 108. For example, each intermediate processor 108 could retrieve input data generated by one or more source connectors 104 and/or one or more other intermediate processors 108 within system 100. Each intermediate processor 108 could then perform aggregation, transformation, filtering, joining, windowing, partitioning, and/or other types of operations on the input data to generate one or more types of output data.

Each sink connector 110 performs writes related to data from system 100 to an external sink 110. For example, each sink connector 110 could receive, as input, data generated by one or more source connectors 104 and/or one or more intermediate processors 108. Each sink connector 110 could then write the data to a corresponding sink 112, thereby replicating data from system 100 to the corresponding sink 112.

Source connectors 104, intermediate processors 108, and sink connectors 110 are used to form a number of data pipelines for processing data within system 100. Each data pipeline includes a series of data processing and data transport operations performed by one or more source connectors 104, one or more optional intermediate processors 108, and one or more sink connectors 110. The source connector(s) import data from one or more sources 102 into the data pipeline, the intermediate processor(s) perform a series of data-processing operations on the data, and the sink connector(s) export the data-processing results to one or more sinks 112.

In addition, source connectors 104, intermediate processors 108, and sink connectors 110 transport and process data within system 100 via a number of data streams 106(1)-106(Y). Each of data streams 106(1)-106(Y) is referred to individually as data stream 106.

In one or more embodiments, data streams 106 are created and managed via a distributed streaming-processing platform. Within the distributed stream-processing platform, each stream 106 includes one or more sequences of messages that are identified by the same topic. A data processor that produces data within system 100 (e.g., source connector 104 or intermediate processor 108) publishes the data as one or more streams 106 of messages to one or more topics. A data processor that consumes data within system 100 receives the data by subscribing to one or more topics and reading the messages published to the topic(s) by one or more other data processors. By decoupling generation of the messages by producers of data from receipt of the messages by consumers of the data, the distributed stream-processing platform allows topics, streams, and data processors to be dynamically added, modified, replicated, and removed without interfering with the transmission and receipt of messages using other topics, streams, and data processors.

Within the distributed stream-processing platform, each source connector 104 exports changes out of a corresponding source 102 by writing events (e.g., CDC events) that capture the changes to one or more topics within the distributed streaming platform. Each intermediate processor 108 subscribes to a given topic within the distributed streaming platform to receive data that is written to the topic by a source connector and/or a different intermediate processor. Each intermediate processor 108 also writes output data that is generated after processing the input data to one or more other topics within the distributed streaming platform. Each sink connector 110 receives data from one or more source connectors 104 and/or one or more intermediate processors 108 by subscribing to the corresponding topics. Each sink connector 110 then replicates the data on a corresponding sink 112 by performing writes of the data to the corresponding sink 112.

While the operation of system 100 has been described with respect to streams 106 in a distributed stream-processing framework, those skilled in the art will appreciate that system 100 can use other types of frameworks or platforms to import, process, and/or export data. For example, system 100 could use a distributed messaging system, event-based monitoring system, CDC pipeline, batch-processing system, and/or another type of data transportation system to transmit data across source connectors 104, intermediate processors 108, and sink connectors 110.

In one or more embodiments, source connectors 104, intermediate processors 108, and sink connectors 110 are configured for reuse by multiple entities. For example, source connectors 104, intermediate processors 108, and sink connectors 110 could be implemented by developers and include templates for configuration or customization by other users. System 100 could also provide a user interface for creating, updating, and/or managing source connectors 104, intermediate processors 108, sink connectors 110, and/or data pipelines via the corresponding templates. Within the user interface, a user could search for existing source connectors 104, intermediate processors 108, sink connectors 110, and/or datasets produced or consumed by the existing source connectors 104, intermediate processors 108, and/or sink connectors 110. The user could also interact with the user interface to specify fields in a template that is used to configure a new source connector 104, intermediate processor 108, and/or sink connector 110. The user could further interact with the user interface to create and/or modify a data pipeline by connecting graphical representations of one or more source connectors 104, intermediate processors 108, and/or sink connectors 110 with directed edges that denote the flow of data between the corresponding components. Consequently, each source connector 104, intermediate processor 108, and/or sink connector 110 can be created once and adapted for different uses by other users. Further, the user interface and templates for source connectors 104, intermediate processors 108, and/or sink connectors 110 allow the other users to configure source connectors 104, intermediate processors 108, sink connectors 110, and/or data pipelines without requiring the other users to possess deep knowledge of the underlying data transport and/or data-processing frameworks.

As shown in FIG. 1, system 100 additionally includes a controller 114 that is coupled to source connectors 104, intermediate processors 108, sink connectors 110, and/or other components of system 100. As described in further detail below, controller 114 performs centralized tracking and management of data processors in system 100 and schemas for data produced or consumed by the data processors. Consequently, controller 114 improves the reusability and discoverability of data and data pipelines within system 100 and minimizes overhead and disruptions caused by changes to the operation of individual components within system 100.

Figure 2:
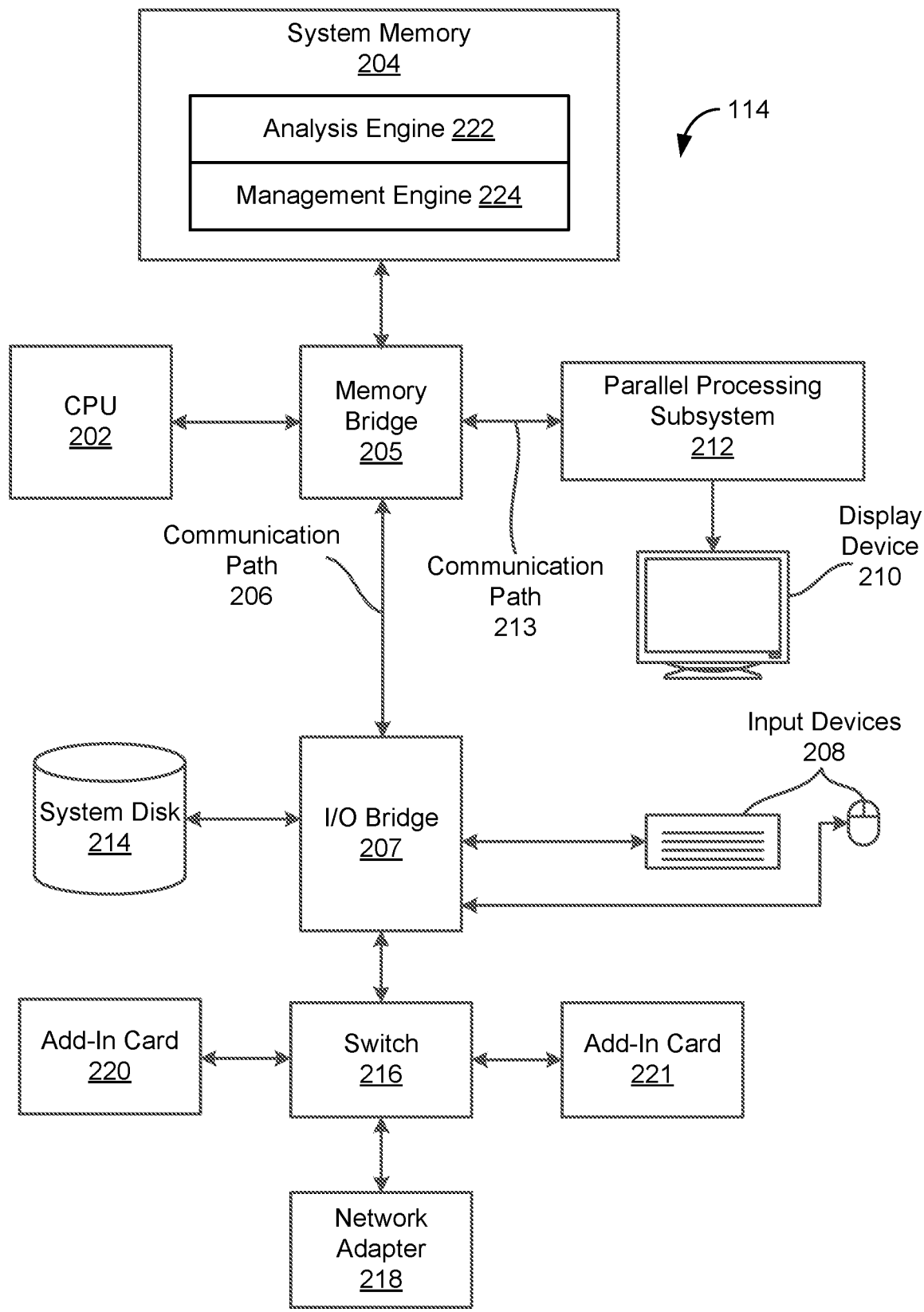
FIG. 2 is a more detailed illustration of the controller of FIG. 1, according to various embodiments.

FIG. 2 is a more detailed illustration of controller 114 of FIG. 1, according to various embodiments. It is noted that controller 114 described herein is illustrative and that any other technically feasible configurations fall within the scope of the present invention. For example, the hardware and/or software components of controller could be implemented on source connectors 104, intermediate processors 108, sink connectors 110, and/or other components of system 100. In another example, multiple instances of controller 114 may execute on a set of nodes in a data center, cluster, or cloud computing environment to implement the functionality of controller 114.

As shown, controller 114 includes, without limitation, a central processing unit (CPU) 202 and a system memory 204 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In operation, I/O bridge 207 is configured to receive user input information from input devices 208, such as a keyboard or a mouse, and forward the input information to CPU 202 for processing via communication path 206 and memory bridge 205. Switch 216 is configured to provide connections between I/O bridge 207 and other components of controller 114, such as a network adapter 218 and various add-in cards 220 and 221.

I/O bridge 207 is coupled to a system disk 214 that may be configured to store content, applications, and data for use by CPU 202 and parallel processing subsystem 212. As a general matter, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, memory bridge 205 may be a Northbridge chip, and I/O bridge 207 may be a Southbridge chip. In addition, communication paths 206 and 213, as well as other communication paths within controller 114, may be implemented using any technically suitable protocols, including, without limitation, AGP (Accelerated Graphics Port), HyperTransport, or any other bus or point-to-point communication protocol known in the art.

In some embodiments, parallel processing subsystem 212 includes a graphics subsystem that delivers pixels to a display device 210, which may be any conventional cathode ray tube, liquid crystal display, light-emitting diode display, or the like. In such embodiments, parallel processing subsystem 212 incorporates circuitry optimized for graphics and video processing, including, for example, video output circuitry. Such circuitry may be incorporated across one or more parallel processing units (PPUs) included within parallel processing subsystem 212. In other embodiments, parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 204 includes at least one device driver configured to manage the processing operations of the one or more PPUs within parallel processing subsystem 212.

In various embodiments, parallel processing subsystem 212 may be integrated with one or more of the other elements of FIG. 2 to form a single system. For example, parallel processing subsystem 212 may be integrated with CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 204 could be connected to CPU 202 directly rather than through memory bridge 205, and other devices would communicate with system memory 204 via memory bridge 205 and CPU 202. In other alternative topologies, parallel processing subsystem 212 may be connected to I/O bridge 207 or directly to CPU 202, rather than to memory bridge 205. In still other embodiments, I/O bridge 207 and memory bridge 205 may be integrated into a single chip instead of existing as one or more discrete devices. Lastly, in certain embodiments, one or more components shown in FIG. 2 may not be present. For example, switch 216 could be eliminated, and network adapter 218 and add-in cards 220, 221 would connect directly to I/O bridge 207. In another example, display device 210 and/or input devices 208 may be omitted for some or all computers in a cluster.

In some embodiments, controller 114 is configured to run an analysis engine 222 and a management engine 224 that reside in system memory 204. Analysis engine 222 and management engine 224 may be stored in system disk 214 and/or other storage and loaded into system memory 204 when executed.

Analysis engine 222 maintains a logical representation of dependencies across source connectors 104, intermediate processors 108, and sink connectors 110 in system 100. Analysis engine 222 also stores and tracks schemas for data that is produced or consumed by each source connector 104, intermediate processor 108, and sink connector 110. When a change is made to a given schema, analysis engine 222 uses the logical representation and schemas to perform compatibility checks between the schema and downstream components that are affected by the change.

Management engine 224 manages the deployment and execution of source connectors 104, intermediate processors 108, and sink connectors 110 within system 100. More specifically, management engine 224 deploys, terminates, or configures the operation of source connectors 104, intermediate processors 108, and sink connectors 110 based on the corresponding configurations, schemas, and compatibility checks performed by analysis engine 222. Consequently, analysis engine 222 and management engine 224 perform centralized tracking and management of source connectors 104, intermediate processors 108, and sink connectors 110 that supports the discovery, reuse, integrity, and update of data processors and data pipelines within system 100. The operation of analysis engine 222 and management engine 224 is described in further detail below.

Schema-Driven Distributed Data Processing

Figure 3:
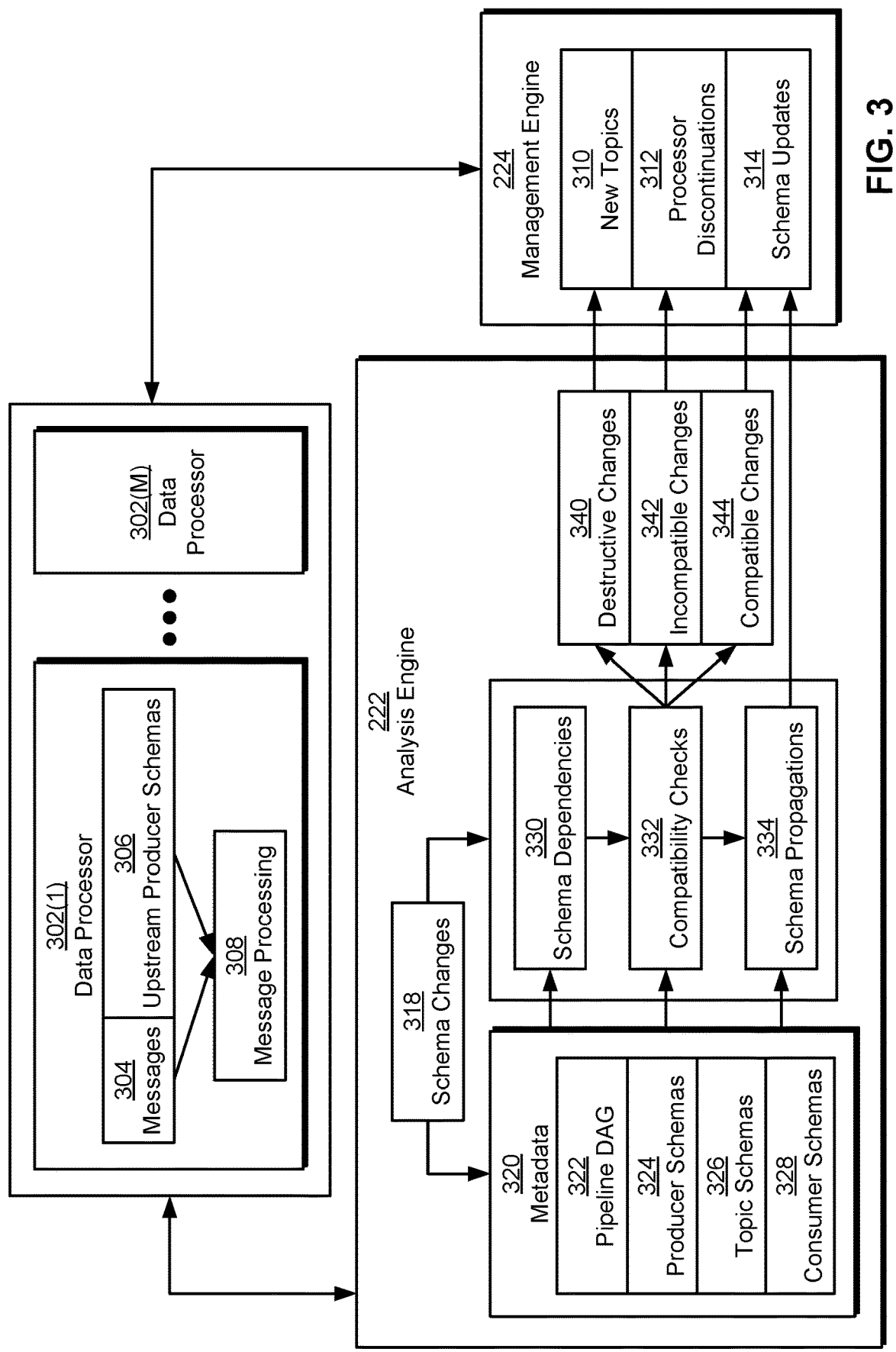
FIG. 3 is a more detailed illustration of the analysis engine and management engine of FIG. 2, according to various embodiments.

FIG. 3 is a more detailed illustration of analysis engine 222 and management engine 224 of FIG. 2, according to various embodiments. As mentioned above, analysis engine 222 and management engine 224 track and manage the operation of a number of data processors 302(1)-302(M) in system 100. Each of data processors 302(1)-302(M) is referred to individually as data processor 302 and can include a source connector 104, intermediate processor 108, and/or sink connector 110.

Analysis engine 222 maintains metadata 320 related to data processors 302. For example, analysis engine 222 could receive metadata 320 and/or updates to metadata 320 in real-time or near-real-time from data processors 302, user interfaces for configuring data processors 302, developers or administrators associated with data processors 302, application-programming interfaces (APIs) associated with data processors 302, and/or other sources. Analysis engine 222 could store metadata 320 in an in-memory cache, one or more files, a database, and/or another type of data store. Analysis engine 222 could also, or instead, process queries of metadata 320, generate user interface output that includes metadata 320, write metadata 320 to one or more files, and/or otherwise provide metadata 320 to users or other entities for the purposes of discovering, using, or auditing data processors 302 and/or data generated or consumed by data processors 302.

As shown in FIG. 2, metadata 320 includes a pipeline directed acyclic graph (DAG) 322, a set of producer schemas 324, a set of topic schemas 326, and a set of consumer schemas 328. Pipeline DAG 322 includes a logical representation of data pipelines within system 100. Nodes in pipeline DAG 322 represent data processors 302, and directed edges between pairs of nodes in pipeline DAG 322 denote the flow of data between the corresponding data processors 302. Thus, a given pipeline can be identified within pipeline DAG 322 as a sub-graph that includes a sequence of directed edges from one or more source connectors 104 to one or more sink connectors 110. The sequence of directed edges optionally connects the source connector(s) to one or more intermediate processors 108 and each intermediate processor 108 to one or more other intermediate processors 108 and/or one or more sink connectors 110.

For example, a data pipeline could include one source connector 104 and one sink connector 110. The source connector could export data out of a relational database into system 100, and the sink connector could write the data to an analytics data store. The source connector and sink connector would be represented by a first node and a second node, respectively, in pipeline DAG 322. The flow of data from the source connector to the sink connector would be represented by a directed edge from the first node to the second node within pipeline DAG 322.

In another example, a data pipeline could include three source connectors 104 that export data out of three relational database tables into system 100. The data pipeline could also include a first intermediate processor 108 that consumes the exported data and produces a union of the data and a second intermediate processor 108 that consumes the unioned data outputted by the first intermediate processor 108 and produces enriched data based on the unioned data and an external data source. The data pipeline could additionally include one sink connector 110 that writes the enriched data outputted by the second intermediate processor 108 to an analytics data store. Within pipeline DAG 322, the three source connectors 104 could be represented by a set of three nodes, the first and second intermediate processors 108 could be represented by two nodes, and the single sink connector 110 could be represented by one node. The flow of data across the data pipeline could be represented by three directed edges from the three nodes representing the three source connectors 104 to the node representing the first intermediate processor 108, one directed edge from the node representing the first intermediate processor 108 to the node representing the second intermediate processor 108, and one directed edge from the node representing the second intermediate processor 108 to the node representing the sink connector 110.

Producer schemas 324 include logical representations of data that is generated or outputted by data processors 302, and consumer schemas 328 include logical representations of data that is consumed by data processors 302. As a result, producer schemas 324 are defined for data processors 302 that output data within system 100 (i.e., source connectors 104 and intermediate processors 108), and consumer schemas 328 are defined for data processors 302 that consume data within system 100 (i.e., intermediate processors 108 and sink connectors 110). Each producer schema and each consumer schema includes (but is not limited to) a schema name, a schema namespace, one or more field names, one or more field types, and/or one or more primary keys. Each producer schema or consumer schema optionally includes a "nullability" attribute that identifies a field as capable or not capable of having null values.

Each of producer schemas 324 represents a dataset that is produced by a corresponding data processor 302. For example, a producer schema for a given data processor 302 could specify field names and field types for fields included in messages written by the data processor to a corresponding stream 106. The producer schema could also identify each field as required or optional and specify one of the fields as a primary key.

Each of consumer schemas 328 specifies a set of fields that is required for consumption by the corresponding data processor 302. For example, a consumer schema for a given data processor 302 could include field names and field types for one or more fields that must be consumed by the data processor to generate output data and/or perform writes to an external data store (e.g., one or more sinks 112).

In one or more embodiments, a given data processor 302 includes a separate consumer schema for each set of data that is consumed by the data processor (and therefore produced by an upstream data processor). For example, a data processor that consumes data produced by three upstream data processors 302 could include three consumer schemas 328, one for each of the upstream data processors. Each consumer schema could identify one or more fields from the producer schema for the corresponding upstream data processor as required by the data processor.

As the operation of a given data processor 302 changes over time, the producer and/or consumer schemas for the data processor are updated to reflect these changes. For example, a data processor could initially be configured to output fields A and B at a first time $t_1$. At a time $t_2 > t_1$, the data processor could be updated to output fields A, B, and C. At a time $t_3 > t_2$, the data processor could be updated to output fields A, B, and D. As a result, three different versions of a producer schema for the data processor could be included in metadata 320. Each version of the producer schema is associated with a unique identifier, version number, or another attribute that differentiates the version from other versions of the producer schema for the same data processor. A first version of the producer schema could be associated with a time range of $t_1$ to $t_2$ and include fields A and B. A second version of the producer schema could be associated with a time range of $t_2$ to $t_3$ and include fields A, B, and C. A third version of the producer schema could be associated with a start time of $t_3$ and include fields A, B, and D.

In another example, a data processor could initially be configured at time $t_4$ to consume field E from another data processor. At a time $t_5 > t_4$, the data processor could be updated to consume fields E and F from the other data processor. As a result, two different versions of a consumer schema for the data processor could be included in metadata 320. Each version of the consumer schema is associated with a unique identifier, version number, or another attribute that differentiates the version from other versions of the consumer schema for the same data processor. A first version of the consumer schema could be associated with a time range of $t_4$ to $t_5$ and include field E. A second version of the producer schema could be associated with a start time of $t_5$ and include fields E and F.

As mentioned above, each data processor 302 that produces data within system 100 writes the data to a corresponding stream 106 that is identified by a topic. To track data written to individual topics in system 100, analysis engine 222 aggregates one or more versions of each producer schema into a single topic schema (e.g., topic schemas 326) for the corresponding topic. A given version of the topic schema is backward compatible with all versions of the producer schema up to the point at which the version of the topic schema was created. The version of the topic schema can also be used to read all messages in the topic that conform to the versions of the producer schema from which the version of the topic schema was created. As a result, the topic schema can be used to configure data processors 302 that consume from the topic and/or create consumer schemas for those data processors 302.

For example, analysis engine 222 could receive three versions of a producer schema for a data processor over time. The first version includes a required field A and an optional field B; the second version includes the required field A, the optional field B, and a required field C; and the third version includes the required field A, the optional field B, and a required field D, respectively. Analysis engine 222 could also generate three corresponding versions of a topic schema for the topic that stores data associated with the producer schema. A field is listed as required in the topic schema if the field is present and required in all versions of the producer schema that are aggregated into the topic schema. A field is listed as optional in the topic schema if the field is optional in any version of the producer schema or is not present in all versions of the producer schema. Thus, the first version of the topic schema could be created based on the first version of the producer schema and include the same required field A and optional field B. The second version of the topic schema could be created based on the first and second versions of the producer schema and include required field A, optional field B, and optional field C. The third version of the topic schema could be created based on all three versions of the producer schema and include required field A, optional field B, optional field C, and optional field D.

In one or more embodiments, producer schemas 324, consumer schemas 328, and/or other metadata 320 associated with data processors 302 is referenced from or stored in the corresponding nodes in pipeline DAG 322. For example, each node in pipeline DAG 322 could include one or more producer schemas 324 for data generated by the corresponding data processor 302 and/or one or more consumer schemas 328 for data consumed by the corresponding data processor 302. Each node in pipeline DAG 322 could also, or instead, include an identifier, path, link, or another data element that can be used to identify or retrieve the producer and/or consumer schemas. In another example, each node in pipeline DAG 322 could store, link to, or otherwise identify a configuration for the corresponding data processor 302.

As shown in FIG. 3, analysis engine 222 uses metadata 320 to analyze the effects of schema changes 318 made to producer schemas 324 and/or consumer schemas 328 for individual data processors 302 on other data processors 302 in the same data pipelines. For example, schema changes 318 could be made to producer schemas 324 and/or consumer schemas 328 by users associated with the corresponding data processors 302. Schema changes 318 could include (but are not limited to) adding or removing an optional field, adding or removing a required field, renaming a field, changing the field type (e.g., data type) of a field, and/or changing the primary key in a given producer or consumer schema.

As with other metadata 320, schema changes 318 can be received in real-time or near-real-time from data processors 302, user interfaces for configuring data processors 302, developers or administrators associated with data processors 302, APIs associated with data processors 302, and/or other sources. After a schema change is received, analysis engine 222 validates the schema change, transmits an acknowledgment of the schema change, and updates the corresponding producer schema or consumer schema in metadata 320.

Next, analysis engine 222 uses pipeline DAG 322 to determine any schema dependencies 330 associated with the schema change. In one or more embodiments, schema dependencies 330 include other data processors that are affected by the schema change. When a schema change is made to a producer schema for a given data processor 302, analysis engine 222 traverses pipeline DAG 322 to identify schema dependencies 330 as any other data processors that consume data represented by the producer schema.

Analysis engine 222 also performs compatibility checks 332 that determine whether the schema change to a producer schema interferes with the consumption of data represented by the producer schema by downstream data processors 302 included in schema dependencies 330. As shown in FIG. 3, compatibility checks 332 are used to classify schema changes 318 as destructive changes 340, incompatible changes 342, and/or compatible changes 344.

In one or more embodiments, destructive changes 340 include schema changes 318 to producer schemas 324 that disrupt the consumption of the corresponding data by all downstream data processors 302. For example, analysis engine 222 could determine that a schema change to a producer schema is disruptive when the schema change includes changing a field type, changing a primary key, and/or making another type of change that interferes with the integrity or ordering of the resulting data.

While destructive changes 340 affect all downstream data processors 302 associated with a given producer schema, incompatible changes 342 and compatible changes 344 are determined with respect to individual data processors 302 that consume data represented by a change to a producer schema. A schema change to a producer schema is an incompatible change with respect to a downstream data processor 302 when the schema change interferes with the downstream data processor's consumption of the corresponding data. Conversely, a schema change to producer schema is a compatible change with respect to a downstream data processor 302 when the schema change does not interfere with the downstream data processor's consumption of the corresponding data.

In one or more embodiments, analysis engine 222 determines that a schema change that adds or removes an optional field, adds a required field, or renames a field in a producer schema is compatible with all consumer schemas for downstream data processors 302 that consume data represented by the producer schema. When a schema change removes a required field in a producer schema, analysis engine 222 determines that the schema change is compatible with a consumer schema if the field is not included in the consumer schema and incompatible with a consumer schema if the field is included in the consumer schema.

Analysis engine 222 also determines schema propagations 334 based on the results of compatibility checks 332. In one or more embodiments, schema propagations 334 include propagation of some or all fields from a first producer schema for a first data processor to a second producer schema for a second data processor that consumes data generated by the first data processor. As a result, schema propagations 334 can be performed to automatically synchronize schema changes 318 made to producer schemas 324 with downstream data processors 302, when these schema changes 318 are compatible with consumer schemas 328 for the downstream data processors 302.

In some embodiments, analysis engine 222 determines schema propagations 334 based on configurations for data processors 302 that are included in schema dependencies 330 for a given schema change. Each configuration includes a flag or another type of attribute that specifies whether the corresponding data processor has "opted in" to schema propagations 334 from one or more upstream data processors. For example, a data processor could be set to "opt in" to schema propagations 334 from the upstream data processor(s) if the data processor performs a "pass through" of all fields from the upstream data processor(s) (e.g., if the data processor writes the fields to a sink or performs filtering of values in the fields). When a given data processor opts in to schema propagations 334 from the upstream data processor (s), a consumer schema that specifies the data processor's requirements for consuming data from the upstream data processor is not required.

On the other hand, a data processor could be set to "opt out" of schema propagations 334 from one or more upstream data processors if the data processor consumes a specific subset of fields from a topic to which the upstream data processor(s) write data (e.g., if the data processor performs projection, enrichment, and/or another operation based on the subset of fields from the upstream data processor(s)). When a given data processor opts out of schema propagations 334, the configuration for the data processor includes a consumer schema that identifies the subset of fields from the topic that are consumed by the data processor.

If the data processor is set to "opt in" to schema propagations 334 and the consumer schema for the data processor is compatible with a given set of schema changes 318 to a topic schema for a topic consumed by the data processor, analysis engine 222 determines that all fields in the topic schema to which the set of schema changes 318 are made are to be propagated to the data processor. If the data processor is set to "opt out" of schema propagations 334 and the consumer schema for the data processor is compatible with a given set of schema changes 318 to the topic schema, analysis engine 222 determines that any schema changes 318 that apply to fields included in the consumer schema for the data processor are to be propagated from the topic schema to the data processor.

While the operation of analysis engine 222 has been described above with respect to schema changes 318 to producer schemas 324 or topic schemas 326, analysis apparatus 222 can also determine schema dependencies 330 and perform compatibility checks 332 for schema changes 318 to consumer schemas 328. For example, when a schema change is made to a consumer schema for a given data processor 302, analysis engine 222 could traverse pipeline DAG 322 to identify schema dependencies 330 as a topic schema for a topic consumed by the given data processor 302. Analysis engine 222 could also perform compatibility checks 332 to determine if the schema change made to the consumer schema renders the consumer schema incompatible with the topic schema. If the schema change includes adding a field to the consumer schema that is not found in the topic schema, analysis engine 222 could determine that the schema change is incompatible with the topic schema. If the schema change does not include adding a field to the consumer schema that is not found in the topic schema, analysis engine 222 could determine that the schema change is compatible with the topic schema.

In some embodiments, management engine 224 manages the deployment, execution, and termination of data processors 302. First, management engine 224 deploys each data processor 302 with a fixed configuration that includes one or more producer schemas 324 for data produced by the data processor, one or more consumer schemas 328 for data consumed by the data processor, and a set of configuration fields that define the operation of the data processor and/or the data processor opting in or out of schema propagations 334 from upstream data processors. The fixed configuration ensures that the data processor processes only compatible data and produces data with a fixed producer schema. Management engine 224 can subsequently redeploy the data processor to change the configuration and operation of the data processor.

Management engine 224 also performs actions that address destructive changes 340, incompatible changes 342, and compatible changes 344 identified by analysis engine 222. First, management engine 224 generates new topics 310 and corresponding topic schemas in response to schema changes 318 that are identified as destructive changes 340. After management engine 224 creates a new topic and a corresponding topic schema in response to a destructive schema change to a producer schema, a data processor that produces data according to the producer schema can write data that reflects the destructive schema change to the new topic. At the same time, downstream data processors 302 that consume data produced by the data processor can use an older version of the topic schema to read and process messages 304 from an existing topic. Consequently, new topics 310 preserve the integrity and ordering of data produced by data processors 302, even after destructive changes 340 are made to producer schemas 324 for these data processors 302.

Second, management engine 224 carries out processor discontinuations 312 for data processors 302 that are associated with incompatible changes 342. More specifically, management engine 224 discontinues the execution of any data processor with a consumer schema that is determined by analysis engine 222 to be incompatible with a corresponding upstream topic schema. Management engine 224 also generates an alert, notification, and/or other output that communicates the incompatibility to a developer, administrator, and/or another user associated with the discontinued data processor. These processor discontinuations 312 prevent the corresponding data processors from attempting to read or process data that is incompatible with the operation of the data processors.

Third, management engine 224 performs schema updates 314 that carry out schema propagations 334 associated with compatible changes 344. As described above, analysis engine 222 determines that all fields from a producer schema for a data processor are to be propagated to a producer schema for a downstream data processor when the downstream data processor "opts in" to schema propagations 334 from the data processor and the topic schema for the topic to which the data processor writes data is compatible with a corresponding consumer schema for the downstream data processor. When both conditions are met, management engine 224 performs schema updates 314 that copy all fields in the producer schema for the upstream data processor to the producer schema for the downstream data processor.

Alternatively, analysis engine 222 determines that a subset of fields from a topic schema for the topic to which a data processor writes data are to be propagated to a producer schema for a downstream data processor when the downstream data processor "opts out" of schema propagations 334 from the data processor and the producer schema for the data processor is compatible with a corresponding consumer schema for the downstream data processor. In this instance, management engine 224 copies any schema changes 318 that apply to fields in the consumer schema for the downstream data processor from the producer schema for the data processor to the producer schema for the downstream data processor.

After schema updates 314 are made to the producer schema for a given data processor 302, management engine 224 redeploys the data processor with schema updates 314 to allow the data processor to operate based on schema updates 314. The redeployment of the data processor for an updated producer schema is detected by analysis engine 222 as another set of schema changes 318 to the producer schema for the data processor. Analysis engine 222 then repeats the process of determining schema dependencies 330, performing compatibility checks 332, and determining schema propagations 334 associated with the data processor and any downstream data processors, and management engine 224 performs actions that affect the downstream data processors based on the results of compatibility checks 332 and schema propagations 334. Consequently, schema propagations 334 can be applied recursively by analysis engine 222 and management engine 224 across stages of a data pipeline until the end of the data pipeline and/or a data processor that has opted out of schema propagations 334 is reached.

Those skilled in the art will appreciate that a schema change can be made to a producer schema for a data processor before a downstream data processor that consumes data produced by the data processor is made aware of the schema change. More specifically, the data processor can begin writing messages that reflect the schema change before the schema change is propagated to the downstream data processor. As a result, the downstream data processor can encounter a message that conforms to the new producer schema before the downstream data processor is redeployed with a configuration that includes the new producer schema.

In one or more embodiments, each data processor 302 includes functionality to perform "schema-aware" message processing 308 that accounts for changes in upstream producer schemas 306 for messages 304 consumed by the data processor. This "schema-aware" message processing 308 is performed differently by data processors 302 that "opt in" to schema propagations 334 from the upstream producer schemas 306 and data processors 302 that "opt out" of schema propagations 334 from the upstream producer schemas 306.

First, a data processor that opts out of schema propagations 334 performs message processing 308 of messages 304 associated with a new producer schema by attempting to deserialize messages 304 using a consumer schema in the configuration for the data processor. If the data processor is able to deserialize a message using the consumer schema (e.g., if the message includes all fields required in the consumer schema), the data processor continues processing the message using the configuration with which the data processor was deployed. If the data processor is unable to deserialize a message using the consumer schema (e.g., if the message does not include all fields required in the consumer schema), the data processor does not process the message. As mentioned above, if the new producer schema is incompatible with the consumer schema, management engine 224 discontinues execution of the data processor once the incompatibility is detected to prevent the data processor from incorrectly consuming messages 304 associated with the new producer schema. Consequently, both the data processor and management engine 224 include safeguards for preventing the data processor from consuming data that is incompatible with the consumer schema for the data processor.

Second, a data processor 302 that "opts in" to schema propagations 334 is deployed with a configuration that includes a whitelist of upstream producer schemas 306 for each upstream data processor 302. If a message is associated with a new producer schema that is not in the whitelist, the data processor stops processing the message. This whitelisting of producer schemas on individual data processors 302 allows management engine 224 to "pause" processing of data that adheres to the new producer schema on a given data processor. During this pause, management engine 224 applies schema propagations 334 to downstream data processors 302 and redeploys the downstream data processors 302 with the corresponding schema updates 314. Once the downstream data processors 302 have been redeployed with the new producer schema and are "ready" to accept messages that adhere to the new producer schema, management engine 224 redeploys the data processor with the new producer schema in the whitelist to enable processing of data that adheres to the new producer schema by the data processor. At the same time, the reconfiguration and redeployment of the data processor, downstream data processors 302, and/or sinks 112 does not block the generation of messages that conform to the new producer schema by the upstream data processor.

Figure 4A:
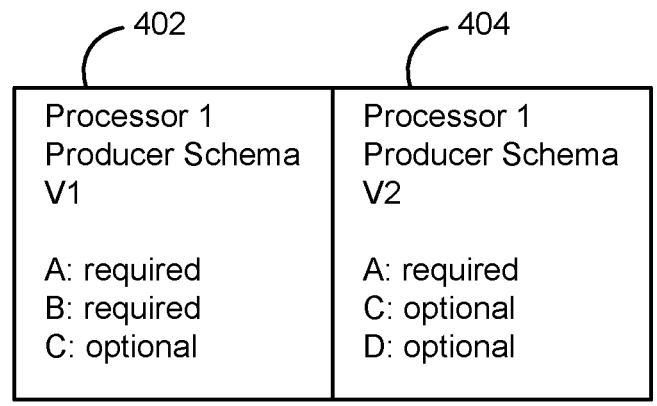
FIG. 4A illustrates an exemplar set of schemas associated with a first data processor, according to various embodiments.

FIG. 4A illustrates an exemplar set of schemas 402-404 and 422-424 associated with a first data processor, according to various embodiments. Schema 402 is a first version of a producer schema for the first data processor, and schema 404 is a second version of the producer schema for the first data processor. Schema 422 is a first version of a topic schema for a topic to which the first data processor writes data, and schema 424 is a second version of the topic schema. Schema 402 indicates that data produced by the first data processor up to a certain point includes a required field A, a required field B, and an optional field C. Schema 404 indicates that data produced by the first data processor after that point includes the required field A and optional field C, lacks field B, and has a new optional field named D. Schema 422 is identical to schema 402, and schema 424 includes fields that are in both versions of the producer schema. Schema 424 indicates that field A is required to reflect the requirement of field A is required in both versions of the producer schema. Schema 424 also indicates that fields B, C, and D are optional because these fields are optional in one or both versions of the producer schema or are not present in all versions of the producer schema.

Figure 4B:
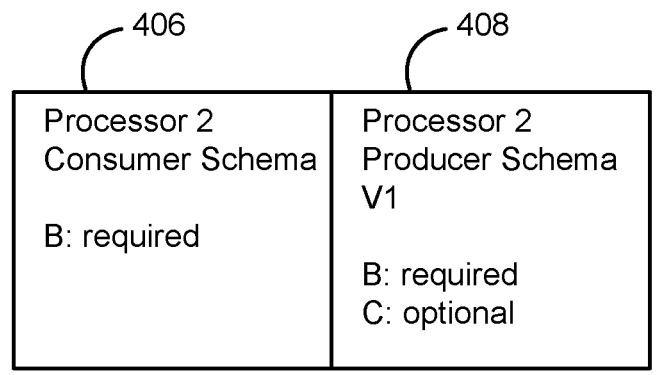
FIG. 4B illustrates an exemplar set of schemas associated with a second data processor that consumes data produced by the first data processor of FIG. 4A, according to various embodiments.

FIG. 4B illustrates an exemplar set of schemas 406-408 associated with a second data processor that consumes data produced by the first data processor of FIG. 4A, according to various embodiments. Schema 406 is a consumer schema for the second data processor, and schema 408 is a first version of a producer schema for the second data processor.

As shown in FIG. 4B, schema 406 indicates that field B is required for consumption by the second data processor. Schema 408 indicates that data produced by the second processor includes required field B and optional field C. Thus, while the first data processor is configured to produce data that conforms to schema 402, the second data processor consumes the data outputted by the first data processor and produces additional data that conforms to schema 408.

Because field B is required in schema 402 and missing from schema 404, schema 406 is compatible with schema 402 and incompatible with schema 404. This incompatibility can be determined by examining the topic schema 424 corresponding to schema 404 and determining that field B is not required in schema 424. This incompatibility between schema 406 and schema 404 additionally causes the second data processor to discontinue execution after the first data processor produces data that conforms to schema 404. Consequently, the second data processor lacks a second version of a producer schema that corresponds to schema 404. The operation of the second processor can then be resumed after the incompatibility is resolved (e.g., by removing field B from schema 406).

FIG. 4C illustrates an exemplar set of schemas 410-412 associated with a third data processor that consumes data produced by the first data processor of FIG. 4A, according to various embodiments. More specifically, FIG. 4C illustrates a set of schemas 410-412 for a third data processor that has "opted out" of schema propagation from the first data processor. As described above, this "opt out" can be specified in a configuration for the third data processor.

As shown in FIG. 4C, schema 410 is a consumer schema for the third data processor, and schema 412 is a first version of a producer schema for the third data processor. Schema 410 indicates that field A is required for consumption by the third data processor. As a result, schema 410 is compatible with both producer schemas 402 and 404 for the first data processor.

Schema 412 includes a required field A and an optional field E. Because schema propagation from the first data processor to the third data processor is not performed, schema 412 differs from either of the producer schemas 402 or 404 for the first data processor. Further, the creation of a second producer schema 404 for the first data processor does not result in the creation of a corresponding producer schema for the third data processor. In other words, schema 410-412 indicate that the data produced by the third data processor is independent of the data produced by the first data processor, as long as the data produced by the first data processor is compatible with the required fields specified in the consumer schema 410 for the third data processor.

FIG. 4D illustrates an exemplar set of schemas 416-420 associated with a fourth data processor that consumes data produced by the first data processor of FIG. 4A, according to various embodiments. More specifically, FIG. 4D illustrates a set of schemas 416-420 for a fourth data processor that has "opted in" to schema propagation from the first data processor. As discussed above, this "opt in" can be specified in a configuration for the fourth data processor.

As shown in FIG. 4D, schema 416 is a consumer schema for the fourth data processor, schema 418 is a first version of a producer schema for the fourth data processor, and schema 420 is a second version of the producer schema for the fourth data processor. Schema 416 indicates that field A is required for consumption by the third data processor. As a result, schema 416 is compatible with both producer schemas 402 and 404 for the first data processor. Further, schema 416 can be omitted while the fourth data processor opts in to schema propagation from the first data processor.

Schemas 418 and 420 include the same fields as the corresponding topic schemas 422 and 424 for the topic to which the first data processor writes data. As a result, schemas 418 and 420 reflect the automatic propagation of topic schemas 422 and 424 to the fourth data processor. Subsequent changes to the producer schema for the first data processor are also propagated to corresponding versions of the producer schema for the fourth processor via corresponding topic schemas for the topic, as long as the fourth data processor is configured to "opt in" to schema propagation from the first data processor and the topic schema for the topic to which the first data processor writes data is compatible with the consumer schema 416 for the fourth data processor.

Figure 5:
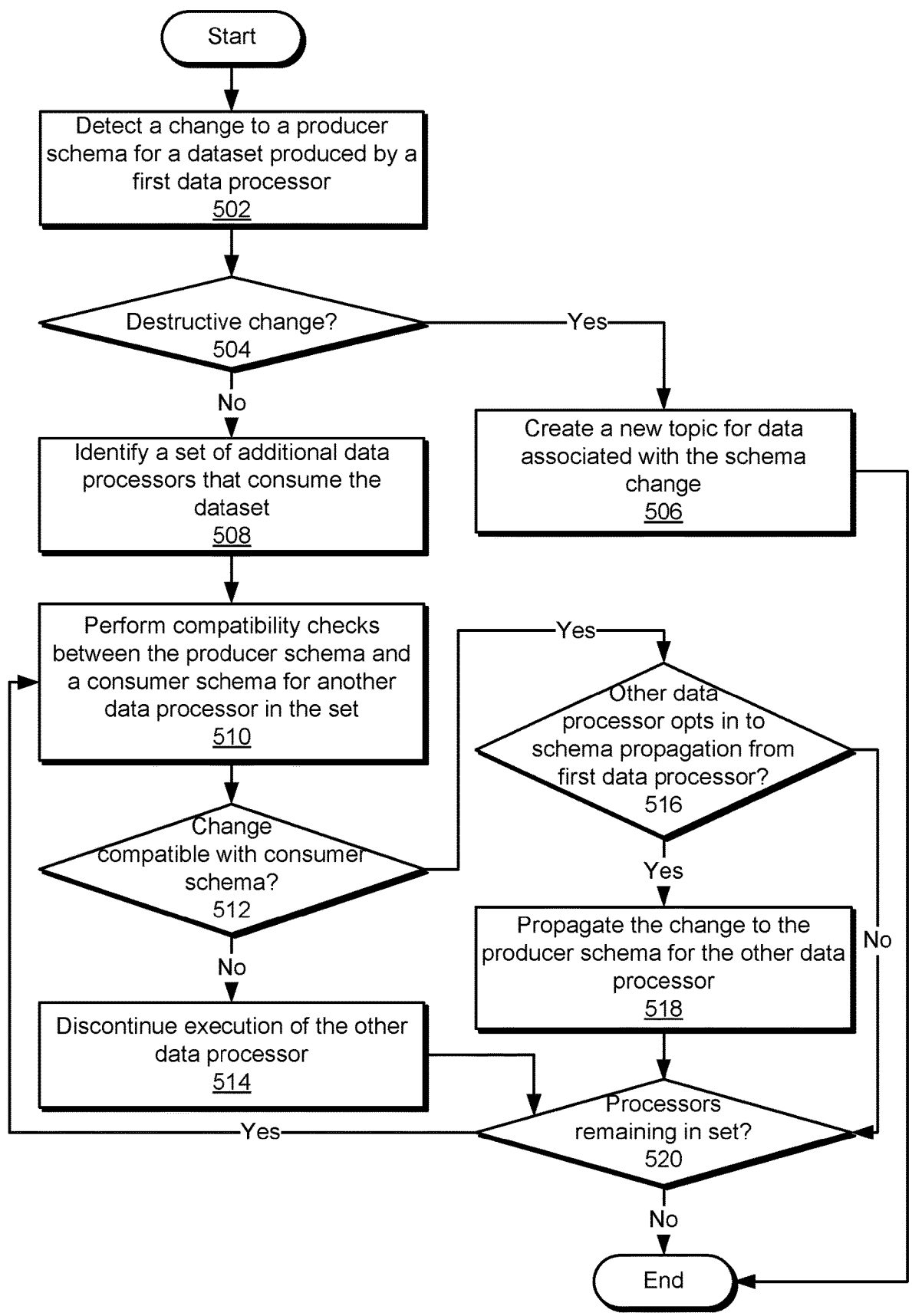
FIG. 5 is a flow diagram of method steps for performing schema-driven data processing, according to various embodiments.

FIG. 5 is a flow diagram of method steps for performing schema-driven data processing, according to various embodiments. Although the method steps are described in conjunction with the systems of FIGS. 1-3, persons skilled in the art will understand that any system configured to perform the method steps in any order falls within the scope of the present disclosure.

As shown, analysis engine 222 detects 502 a change to a producer schema for a dataset produced by a first data processor. For example, analysis engine 222 could receive the change via a user interface, API, user, data store, and/or another mechanism associated with the first data processor. Analysis engine 222 could also, or instead, detect the change within a topic schema for a topic to which the first data processor writes data. The change could include (but is not limited to) adding or removing a required field, adding or removing an optional field, renaming a field, changing a field type of a field, and/or changing the primary key of the dataset.

Next, analysis engine 222 determines 504 if the change is destructive. For example, analysis engine 222 could determine that the change to the producer schema is destructive if the change involves changing a field type and/or primary key in the dataset. If the change to the producer schema does not involve changing a field type or changing a primary key in the dataset, analysis engine 222 could determine that the change is not destructive.

If the change is determined to be destructive, management engine 224 creates 506 a new topic for data associated with the schema change. Management engine 224 also creates a new topic schema for the new topic, where the new topic schema includes the change to the producer schema. After the new topic is created, management engine 224, a user associated with the first data processor, and/or another entity can configure the first data processor to write the data to the new topic to prevent the data from interfering with the ordering or integrity of older data in the dataset. At the same time, other data processors that consume the dataset outputted by the first data processor are able to continue reading messages from an existing topic associated with the dataset using older versions of the producer schema.

If the change is determined to not be destructive, analysis engine 222 identifies 508 a set of additional data processors that consume the dataset. For example, analysis engine 222 could use a DAG and/or another logical representation of a data pipeline that includes the first data processor to identify the additional processors that consume the dataset produced by the first data processor.

Analysis engine 222 also performs 510 compatibility checks between the producer schema and a consumer schema for another data processor in the set to determine 512 if the change is compatible with the consumer schema. For example, analysis engine 222 could determine that the change is compatible with the consumer schema if the change involves adding or removing an optional field, adding a required field, renaming a field, and/or removing a required field that is not included in the consumer schema. Conversely, analysis engine 222 could determine that the change is incompatible with the consumer schema if the change involves removing a required field from the producer schema when the field is also included in the consumer schema.

If the change is incompatible with the consumer schema, management engine 224 discontinues 514 execution of the other data processor. A user associated with the first data processor and/or the other data processor can then resolve the incompatibility by changing the producer schema for the first data processor and/or changing the consumer schema for the other data processor.

If the change is compatible with the consumer schema, analysis engine 222 determines 516 if the other data processor has opted in to schema propagation from the first data processor. For example, analysis engine 222 could determine whether the other data processor has opted in to schema propagation from the first data processor by examining a flag, field, and/or another attribute in a configuration for the other data processor. If the other data processor has opted in to schema propagation from the first data processor, management engine 224 propagates 518 the change to the producer schema for the other data processor. For example, management engine 224 could apply the change to the producer schema for the other data processor, so that the producer schema for the other data processor matches the producer schema for the first data processor. Management engine 224 could also redeploy the other data producer with the updated producer schema to allow the other data producer to process the dataset according to the updated producer schema.

If the other data processor has opted out of schema propagation from the first data processor, management engine 224 does not automatically propagate the change to the producer schema for the other data processor. Instead, management engine 224 propagates the change to the producer for the other data processor if the change is made to a field that is listed in the consumer schema for the other data processor. For example, management engine 224 could propagate a change to a field name from the producer schema for the first data processor to the producer and/or consumer schemas for the other data processor when the field associated with the field name is included in the consumer schema for the other data processor. Management engine 224 could also redeploy the other data processor with the updated producer and/or consumer schemas to allow the other data processor to perform processing based on the updated field name.

After processing related to the first data processor and a given other data processor in the set is complete, analysis engine 222 determines 520 whether any processors remain in the set. If no other processors remain in the set, no additional processing related to the change is performed. If other processors remain in the set, analysis engine 222 and management engine 224 repeat operations 510-518 for each remaining processor to adjust the operation of the other data processor based on the change to the producer schema for the first processor.

In sum, the disclosed techniques perform schema-driven data processing via reusable and configurable data processors. Each data processor performs data-processing operations with respect to one or more input datasets to produce one or more output datasets. A series of data processors can also be linked within a data pipeline, so that the output of a given data processor is used as the input into the next data processor.

Each data processor includes a producer schema that represents data generated by the data processor and/or a consumer schema that represents data that is required for consumption by the data processor. When a change is made to a producer schema for a first data processor, a controller performs compatibility checks involving the change and the consumer schemas of any other data processors that consume data generated by the first data processor. During the compatibility checks, the controller determines that the change is incompatible with a consumer schema when the change includes a field that has been removed from the producer schema and the same field is included in the consumer schema. After the controller identifies a change to the producer schema as incompatible with the consumer schema, the controller discontinues execution of the data processor associated with the consumer schema.

During the compatibility checks, the controller can also determine that the change to the producer schema for the first data processor is compatible with a consumer schema for another data processor if the change to the producer schema does not interfere with consumption of the data generated by the first data processor by the other data processor. For example, the controller could determine that the change to the producer schema is compatible with the consumer schema for the other data processor if the change includes adding a field, renaming a field, and/or removing a field that is not included in the consumer schema. If the change to the producer schema is compatible with the consumer schema, the controller allows execution of the other data processor to continue.

When the producer schema for the first data processor is compatible with the consumer schema for another downstream data processor that consumes data generated by the first data processor, the controller selectively propagates some or all changes to the producer schema to the downstream data processor. If the downstream data processor is configured to "opt in" to schema propagations from the first data processor, the controller propagates all fields from the producer schema for the first data processor to another producer schema for the downstream data processor. If the downstream data processor is configured to "opt out" of schema propagations from the first data processor, the controller propagates fields that are found in the consumer schema for the downstream data processor from the producer schema for the first data processor to the other producer schema for the downstream data processor.

One technical advantage of the disclosed techniques relative to the prior art is that data processors and data schemas are created, tracked, and managed in a centralized manner. Accordingly, the disclosed techniques improve the discoverability and reusability of the data and/or data processors, compared with conventional techniques that lack a centralized mechanism for tracking data sources, data schemas, and/or data pipelines. The improved discovery and reuse of the data and/or data processors additionally reduces resource overhead associated with duplication of data sources and/or data pipelines, in contrast to conventional approaches that involve multiple teams or entities generating data or data processors in isolation. Another technical advantage of the disclosed techniques is that changes to the schema of a first data processor are automatically checked for compatibility with other data processors that depend on the first data processor. Schema changes that are compatible with another data processors can automatically be propagated to the other data processor, while schema changes that are incompatible with another data processor can be used to prevent the other data processor from incorrectly processing data produced by the first data processor. Consequently, the disclosed techniques can be used to efficiently operate and update data pipelines composed of multiple data processors. These technical advantages provide one or more technological improvements over prior art approaches.

1. In some embodiments, a computer-implemented method comprises detecting a first change to a first producer schema for a first dataset produced by a first data processor; performing a compatibility check between the first change and a first consumer schema associated with processing of the first dataset by a second data processor, wherein the first consumer schema comprises a set of fields required by the second data processor; and modifying an operation of the second data processor based on a result of the compatibility check.

2. The computer-implemented method of clause 1, further comprising generating a topic schema for a topic based on one or more versions of the first producer schema for the first dataset; and transmitting the topic schema to the second data processor, wherein the topic schema is used by the second data processor to read one or more messages written to the topic by the first data processor.

3. The computer-implemented method of any of clauses 1-2, wherein generating the topic schema comprises specifying, within the topic schema, that a first field is required when the first field is required in each of the one or more versions of the first producer schema; and specifying, within the topic schema, that a second field is optional when the second field is not required in at least one version of the first producer schema.

4. The computer-implemented method of any of clauses 1-3, further comprising determining that a second change to a second producer schema for a second dataset is to be propagated to a third data processor that consumes the second dataset; and propagating the second change to a third producer schema for a third dataset produced by the third data processor.

5. The computer-implemented method of any of clauses 1-4, further comprising: deploying the third data processor with the second change propagated to the third producer schema for the third dataset; and based on the deployed third data processor, propagating the second change to a fourth producer schema for a fourth dataset produced by a fourth processor that consumes the third dataset.

6. The computer-implemented method of any of clauses 1-5, wherein determining that the second change is to be propagated to the third data processor comprises determining that the third data processor consumes the second dataset based on a logical representation of a data pipeline; and determining that the third data processor has opted into schema propagation from the second dataset based on metadata associated with the third data processor.

7. The computer-implemented method of any of clauses 1-6, wherein modifying the operation of the second data processor comprises determining an incompatibility between the first change and the first consumer schema; and in response to the determined incompatibility, causing execution of the second data processor to discontinue.

8. The computer-implemented method of any of clauses 1-7, further comprising outputting a notification of the incompatibility to an entity associated with at least one of the first data processor or the second data processor.

9. The computer-implemented method of any of clauses 1-8, wherein the first change comprises a removal of a field from the first producer schema.

10. The computer-implemented method of any of clauses 1-9, wherein the first producer schema and the first consumer schema comprise at least one of a schema name, a schema namespace, a field name, a field type, a field nullability, or a primary key.

11. In some embodiments, a non-transitory computer readable medium stores instructions that, when executed by a processor, cause the processor to perform the steps of detecting a first change to a first producer schema for a first dataset produced by a first data processor, wherein the first change comprises a removal of a field from the first producer schema; performing a compatibility check between the first change and a first consumer schema associated with processing of the first dataset by a second data processor, wherein the first consumer schema comprises a set of fields required by the second data processor; and modifying an operation of the second data processor based on a result of the compatibility check.

12. The non-transitory computer readable medium of clause 11, wherein the instructions further cause the processor to perform the steps of determining that a second change to a second producer schema for a second dataset cannot be used with a first topic to which the second dataset is written; and creating a second topic associated with the second dataset, wherein a second processor that produces the second dataset writes one or more messages that reflect the second change to the second topic.

13. The non-transitory computer readable medium of any of clauses 11-12, wherein the second change comprises at least one of a change to a field type included in the second producer schema or a change to a primary key in the second producer schema.

14. The non-transitory computer readable medium of any of clauses 11-13, wherein the instructions further cause the processor to perform the steps of determining that a second change to a second producer schema for a second dataset is to be propagated to a third data processor that consumes the second dataset; propagating the second change to a third producer schema for a third dataset produced by the third data processor; and deploying the third data processor with the second change propagated to the third producer schema for the third dataset.

15. The non-transitory computer readable medium of any of clauses 11-14, wherein the third data processor stops processing of the second dataset after the second change is made to the second producer schema and before the third data processor is deployed with the second change propagated to the third producer schema.

16. The non-transitory computer readable medium of any of clauses 11-15, wherein modifying the operation of the second data processor comprises determining a compatibility between the first change to the first producer schema and a second consumer schema associated with processing of the first dataset by a third data processor; and in response to the determined compatibility, causing execution of the third data processor to continue.

17. The non-transitory computer readable medium of any of clauses 11-16, wherein the compatibility is determined based on an omission of a field associated with the first change from the second consumer schema.

18. The non-transitory computer readable medium of any of clauses 11-17, wherein modifying the operation of the second data processor comprises determining an incompatibility between the first change and the first consumer schema; and in response to the determined incompatibility, causing execution of the second data processor to discontinue.

19. The non-transitory computer readable medium of any of clauses 11-18, wherein the first data processor comprises at least one of a data source or a first intermediate data processor, and wherein the second data processor comprises at least one of a second intermediate data processor or a data sink.

20. In some embodiments, a system comprises a memory that stores instructions, and a processor that is coupled to the memory and, when executing the instructions, is configured to detect a first change to a first producer schema for a first dataset produced by a first data processor; perform a compatibility check between the first change and a first consumer schema associated with processing of the first dataset by a second data processor, wherein the first consumer schema comprises a set of fields required by the second data processor; modify an operation of the second data processor based on a result of the compatibility check; determine that the first change is to be propagated to a third data processor that consumes the first dataset; propagate the first change to a second producer schema for a second dataset produced by the third data processor; and deploy the third data processor with the first change propagated to the second producer schema for the second dataset.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits.

Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
   detecting, by a controller computing device, a first change to a first producer schema for a first dataset produced by a first data processor, wherein the first producer schema comprises a first set of fields corresponding to data produced by the first data processor, wherein the controller computing device manages one or more operations of a first set of data processors, including the first data processor, that are configured to act, at least in part, as data producers, and a second set of data processors, including a second data processor, that are configured to act, at least in part, as data consumers, and wherein the controller computing device terminates execution of at least one process executing on one or more data processors in the second set of data processors in response to detecting one or more schema incompatibilities;
   performing, by the controller computing device, a compatibility check between the first change and a first consumer schema associated with processing of the first dataset by the second data processor that is separate from the controller computing device, wherein the first consumer schema comprises a second set of fields required by the second data processor, and wherein at least one field in the second set of fields overlaps with the first set of fields;
   when a result of the compatibility check indicates a schema incompatibility between the first change and the first consumer schema, terminating, by the controller computing device, execution of one or more processes executing on the second data processor; and
   when the result of the compatibility check indicates that the first change and the first consumer schema are compatible, propagating one or more fields associated with the first change to a second producer schema for the second data processor based on metadata associated with the second data processor.

2. The computer-implemented method of claim 1, further comprising:
   generating a topic schema for a topic based on one or more versions of the first producer schema for the first dataset; and
   transmitting the topic schema to the second data processor, wherein the topic schema is used by the second data processor to read one or more messages written to the topic by the first data processor.

3. The computer-implemented method of claim 2, wherein the generating the topic schema comprises:
   specifying, within the topic schema, that a first field is required when the first field is required in each of the one or more versions of the first producer schema; and
   specifying, within the topic schema, that a second field is optional when the second field is not required in at least one version of the first producer schema.

4. The computer-implemented method of claim 1, further comprising:
   determining that a second change to the second producer schema for a second dataset is to be propagated to a third data processor that consumes the second dataset; and
   propagating the second change to a third producer schema for a third dataset produced by the third data processor.

5. The computer-implemented method of claim 4, further comprising:
   deploying the third data processor with the second change propagated to the third producer schema for the third dataset; and
   based on the deployed third data processor, propagating the second change to a fourth producer schema for a fourth dataset produced by a fourth processor that consumes the third dataset.

6. The computer-implemented method of claim 4, wherein the determining that the second change is to be propagated to the third data processor comprises:
   determining that the third data processor consumes the second dataset based on a logical representation of a data pipeline; and
   determining that the third data processor has opted into schema propagation from the second dataset based on metadata associated with the third data processor.

7. The computer-implemented method of claim 1, further comprising outputting a notification of the schema incompatibility to an entity associated with at least one of the first data processor or the second data processor.

8. The computer-implemented method of claim 1, wherein the first change comprises a removal of a field from the first producer schema.

9. The computer-implemented method of claim 1, wherein the first producer schema and the first consumer schema comprise at least one of a schema name, a schema namespace, a field name, a field type, a field nullability, or a primary key.

10. A non-transitory computer readable medium storing instructions that, when executed by a processor, cause the processor to perform the steps of:
    detecting, by a controller computing device, a first change to a first producer schema for a first dataset produced by a first data processor, wherein the first producer schema comprises a first set of fields corresponding to data produced by the first data processor and the first change comprises a removal of a field from the first producer schema, wherein the controller computing device manages one or more operations of a first set of data processors, including the first data processor, that are configured to act, at least in part, as data producers, and a second set of data processors, including a second data processor, that are configured to act, at least in part, as data consumers, and wherein the controller computing device terminates execution of at least one process executing on one or more data processors in the second set of data processors in response to detecting one or more schema incompatibilities;
    performing, by the controller computing device, a compatibility check between the first change and a first consumer schema associated with processing of the first dataset by the second data processor that is separate from the controller computing device, wherein the first consumer schema comprises a second set of fields required by the second data processor and wherein at least one field in the second set of fields overlaps with the first set of fields;
    when a result of the compatibility check indicates a schema incompatibility between the first change and the first consumer schema terminating, by the controller computing device, execution of one or more processes executing on the second data processor; and
    when the result of the compatibility check indicates that the first change and the first consumer schema are compatible, propagating one or more fields associated with the first change to a second producer schema for the second data processor based on metadata associated with the second data processor.

11. The non-transitory computer readable medium of claim 10, wherein the instructions further cause the processor to perform the steps of:
determining that a second change to the second producer schema for a second dataset cannot be used with a first topic to which the second dataset is written; and
creating a second topic associated with the second dataset, wherein a third data processor that produces the second dataset writes one or more messages that reflect the second change to the second topic.

12. The non-transitory computer readable medium of claim 11, wherein the second change comprises at least one of a change to a field type included in the second producer schema or a change to a primary key in the second producer schema.

13. The non-transitory computer readable medium of claim 10, wherein the instructions further cause the processor to perform the steps of:
determining that a second change to the second producer schema for a second dataset is to be propagated to a third data processor that consumes the second dataset;
propagating the second change to a third producer schema for a third dataset produced by the third data processor; and
deploying the third data processor with the second change propagated to the third producer schema for the third dataset.

14. The non-transitory computer readable medium of claim 13, wherein the third data processor stops processing of the second dataset after the second change is made to the second producer schema and before the third data processor is deployed with the second change propagated to the third producer schema.

15. The non-transitory computer readable medium of claim 10, wherein the instructions further cause the processor to perform the steps of:
determining a compatibility between the first change to the first producer schema and a second consumer schema associated with processing of the first dataset by a third data processor; and
in response to the determined compatibility, causing execution of the third data processor to continue.

16. The non-transitory computer readable medium of claim 15, wherein the compatibility is determined based on an omission of a field associated with the first change from the second consumer schema.

17. The non-transitory computer readable medium of claim 10, wherein the first data processor comprises at least one of a data source or a first intermediate data processor, and wherein the second data processor comprises at least one of a second intermediate data processor or a data sink.

18. A system, comprising:
a memory that stores instructions, and
a processor that is coupled to the memory and, when executing the instructions, is configured to:
detect, by a controller computing device, a first change to a first producer schema for a first dataset produced by a first data processor, wherein the first producer schema comprises a set of fields corresponding to data produced by the first data processor, wherein the controller computing device manages one or more operations of a first set of data processors, including the first data processor, that are configured to act, at least in part, as data producers, and a second set of data processors, including a second data processor, that are configured to act, at least in part, as data consumers, and wherein the controller computing device terminates execution of at least one process executing on one or more data processors in the second set of data processors in response to detecting one or more schema incompatibilities;
perform, by the controller computing device, a compatibility check between the first change and a first consumer schema associated with processing of the first dataset by the second data processor, wherein the first consumer schema comprises a second set of fields required by the second data processor, and wherein at least one field in the second set of fields overlaps with the first set of fields;
when a result of the compatibility check indicates a schema incompatibility between the first change and the first consumer schema, terminate, by the controller computing device, execution of one or more processes executing on the second data processor;
when the result of the compatibility check indicates that the first change and the first consumer schema are compatible, propagate one or more fields associated with the first change to a second producer schema for the second data processor based on metadata associated with the second data processor.

19. The system of claim 18, wherein the processor is further configured to:
generate a topic schema for a topic based on one or more versions of the first producer schema for the first dataset; and
transmit the topic schema to the second data processor, wherein the topic schema is used by the second data processor to read one or more messages written to the topic by the first data processor.

20. The computer-implemented method of claim 1, wherein the propagating the one or more fields associated with the first change to the second producer schema for the second data processor comprises determining whether the metadata indicates that the second data processor has opted into schema propagation from the first data processor, and wherein the second data processor generates data in accordance with the second producer schema.

* * * * *